US008912276B2

(12) United States Patent
Noopila et al.

(10) Patent No.: US 8,912,276 B2
(45) Date of Patent: Dec. 16, 2014

(54) COATING COMPOSITION

(75) Inventors: Tuomas Noopila, Helsinki (FI); Erik Eriksson, Stenungsund (SE); Magnus Palmlöf, Västra Frölunda (SE); Jari Hätönen, Porvoo (FI); Michiel Bergstra, Berchem (BE); Leif Leiden, Andersböle (FI); Martin Anker, Hisings Kärra (SE); Siw Bodil Fredriksen, Skien (NO)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 14/116,091

(22) PCT Filed: May 4, 2012

(86) PCT No.: PCT/EP2012/001936
§ 371 (c)(1),
(2), (4) Date: Nov. 21, 2013

(87) PCT Pub. No.: WO2012/152421
PCT Pub. Date: Nov. 15, 2012

(65) Prior Publication Data
US 2014/0069547 A1    Mar. 13, 2014

(30) Foreign Application Priority Data
May 6, 2011   (EP) .................................... 11003741

(51) Int. Cl.
C09D 7/12       (2006.01)
F16L 9/14       (2006.01)
C09D 123/08     (2006.01)
F16L 58/10      (2006.01)

(52) U.S. Cl.
CPC ........ C09D 7/1216 (2013.01); C09D 123/0815 (2013.01); F16L 58/1027 (2013.01); F16L 58/1045 (2013.01); F16L 9/14 (2013.01)
USPC ............................ 524/570; 138/145; 427/444

(58) Field of Classification Search
CPC ... C09D 7/1216; C09D 123/0815; F16L 9/14; F16L 58/1027; F16L 58/1045
USPC ............................ 524/570; 138/145; 427/444
See application file for complete search history.

(56) References Cited

U.S. PATENT DOCUMENTS 6,632,680 B1 * 10/2003 DesLauriers et al. ........... 436/85

FOREIGN PATENT DOCUMENTS

| EP | 688794 A1 | 12/1995 |
|---|---|---|
| EP | 810235 A2 | 3/1997 |
| EP | 837915 B1 | 8/2001 |
| EP | 1316598 A1 | 6/2003 |
| EP | 1655334 A1 | 5/2006 |
| EP | 1739103 A1 | 1/2007 |
| EP | 1752462 A1 | 2/2007 |
| EP | 1859926 A1 | 11/2007 |
| EP | 2072586 A1 | 6/2009 |
| EP | 2072587 A1 | 6/2009 |
| EP | 2072588 A1 | 6/2009 |
| EP | 2072589 A1 | 6/2009 |
| WO | 95/12622 A1 | 5/1995 |
| WO | 96/32423 A1 | 10/1996 |
| WO | 97/28170 A1 | 8/1997 |
| WO | 98/32776 A1 | 7/1998 |
| WO | 99/51646 A1 | 10/1999 |
| WO | 99/61489 A1 | 12/1999 |
| WO | 01/55230 A1 | 8/2001 |
| WO | 03/010208 A1 | 2/2003 |
| WO | 03/051514 A2 | 6/2003 |
| WO | 03/051934 A2 | 6/2003 |
| WO | 2004/085499 A2 | 10/2004 |
| WO | 2005/118655 A1 | 12/2005 |
| WO | 2006/053741 A1 | 5/2006 |

OTHER PUBLICATIONS

Katja Klimke et al., "Optimisation and Application of Polyolefin Branch Quantification by Melt-State 13 C NMR Spectroscopy", Macromolecular Chemistry and Physics, vol. 27, pp. 382-395, (2006).
Paul J. DesLauriers et al., "Quantifying Short Chain Branching Microstructures in Ethylene 1-Olefin Copolymers Using Size Exclusion Chromatography and Fourier Transform Infrared Spectroscopy (SEC-FTIR)", Polymer, vol. 43, pp. 159-170, (2002).
Matthew Parkinson et al., "Effect of Branch Length on 13 C NMR Relaxation Properties in Molten Poly[ethylene-co-(αolefin)] Model System", Macromolecular Chemistry and Physics, vol. 208, pp. 2128-2133 (2007).
Christian Piel et al., "Improved SEC-FTIR Method for the Characterization of Multimodal High-Density Polyethylenes", Anal Bioanal Chem, DOI 10.1007/s00216-001-4817-6 (2011).

* cited by examiner

*Primary Examiner* — Kelechi Egwim
(74) *Attorney, Agent, or Firm* — Roberts Mlotkowski Safran & Cole, P.C.

(57) ABSTRACT

Coating composition comprising an ethylene copolymer containing not more than 5 mole-% comonomer, whereby the fraction of the ethylene copolymer having a molecular weight of 300 000 g/mol-600 000 g/mol has a methyl branching of more than 4.0 Methyl per 1000 C as determined by SEC/FT-IR analysis.

15 Claims, No Drawings

COATING COMPOSITION

The present invention is concerned with coating compositions for pipes, with coated pipes and a process for coating of pipes.

BACKGROUND

Polyethylene is widely used for industrial applications in which a material having a high mechanical strength and a high resistance to thermooxidative degradation is required in order to ensure a long life even at elevated use temperatures. In addition, polyethylene has the particular advantages that it has good chemical resistance, it has a low intrinsic weight and it is a material which can easily be processed in the melt.

The use of bimodal or multimodal ethylene polymers in coating of steel pipes is known from EP-A-837915, EP 2 072 586, EP 2 072 587, EP 2 072 588 and EP 2 072 589. WO 2006/053741 discloses the use of a trimodal polyethylene composition having a density of 0.94 to 0.95 g/cm$^3$ comprising 45 to 55 wt. % of a low molecular weight ethylene homopolymer A, from 30 to 40 wt.-% of a high molecular weight copolymer B and from 10 to 20 wt.-% of an ultra high molecular weight ethylene copolymer C for the coating of steel pipes. EP 1655334 reports the use of a polyethylene composition made of three fractions having varying molecular weight for the preparation of pipes, whereby the composition has a high eta747 of at least 350 kPas.

Polyethylene compositions having a significant fraction of ultra high molecular weight material have better processability than classic bimodal polyethylene compositions and have several advantages as to the mechanical properties such as environmental stress cracking resistance. However, processability of such polyethylenes still is limited at high throughput and the provision of adhesion to the usually used adhesive layer obtained by grafting with an acid grafting agent such as maleic acid or maleic anhydride is limited. Thus, there is the need for ultra high throughput coating compositions which have better processability and excellent adhesion to standard adhesion layers while retaining excellent levels of mechanical properties. Even further, the need for $CO_2$ reduction asks for materials allowing less energy intensive production.

SUMMARY OF THE INVENTION

The present invention is based on the finding that these objects can be obtained by an ethylene copolymer having a fraction of high molecular weight material which has a relatively high amount of methyl side groups pro 1000 carbon atoms in a fraction having a molecular weight of 300 000 g/mol-600 000 g/mol for a given comonomer content.

The present invention insofar provides a coating composition comprising an ethylene copolymer containing not more than 5 mole-% comonomer, whereby the fraction of the ethylene copolymer having a molecular weight of 300 000 g/mol-600 000 g/mol has a methyl branching of more than 4.0 Methyl per 1000 C as determined by SEC/FT-IR analysis.

The present invention further provides a pipe being coated with the coating composition according to the present invention and further a process for coating a pipe with the inventive compositions.

DEFINITIONS

A coating composition is a composition which can be supplied on an article for example a pipe.

An ethylene copolymer within this invention is a copolymer being composed of ethylene units and units derived from comonomers, wherein the total comonomer content of the ethylene copolymer is not more than 5.0 mole %.

DETAILED DESCRIPTION

Preferably, the fraction of the ethylene copolymer having a molecular weight of 300 000 g/mol-600 000 g/mol has a methyl branching of more than 4.1 Methyl per 1000 C as determined by SEC/FT-IR analysis, more preferably more than 4.2 and most preferably more than 4.5.

More preferably, the total ethylene copolymer has methyl branching of 1.0 to 3.7 Methyl per 1000 C as determined by SEC/FT-IR analysis.

The analysis is described in detail in the experimental part.

Preferably, the total comonomer content of the ethylene copolymer is not more than 5.0 mole %, more preferably, is not more than 2.5 mole %. The total comonomer content of the ethylene copolymer is preferably at least 0.25 mole %, more preferably at least 0.5 mole %.

Preferably, the comonomer(s) of the ethylene copolymer according to the present invention is/are selected from $C_3$ to $C_{10}$ alpha-olefins, more preferably is/are selected from $C_4$ to $C_8$ alpha-olefins, even more preferably is/are selected from 1-butene, 1-hexene and 1-octene. The most preferred comonomer is 1-hexene.

Preferably, the ethylene copolymer has a density of at least 953.0 kg/m$^3$, more preferably of at least 955.0 kg/m$^3$, most preferably at least 961.0 kg/m$^3$.

The density of the ethylene copolymer is preferably not higher than 975.0 kg/m$^3$, more preferably not higher than 972.0 kg/m$^3$ and most preferably not higher than 970.0 kg/m$^3$.

The ethylene copolymer according to the present invention preferably is an in-situ blend. In-situ blends are obtained by further polymerization of an intermediate product which is obtained in a first polymerization, whereby the further polymerization using the intermediate product as the reactant is effected under different reaction conditions. It should be understood that the production of an in-situ blend does not necessarily require the use of more than one reactor. In-situ blends also can be produced via change of the polymerization conditions during polymerization.

Preferably, the coating composition has an $MFR_2$, determined according to ISO 1133, at 190° C. and under a load of 2.16 kg, of at least 0.01 g/10 min, more preferably of at least 0.05 g/10 min and most preferably of at least 0.1 g/10 min.

The coating composition preferably has an $MFR_2$, determined according to ISO 1133, at 190° C. and under a load of 2.16 kg, of not more than 2.0 g/10 min, more preferably of not more than 1.0 g/10 min, even more preferably of not more than 0.8 g/10 min and most preferably of not more than 0.6 g/10 min.

Preferably, the coating composition has an $MFR_5$, determined according to ISO 1133, at 190° C. and under a load of 5.00 kg, of at least 0.1 g/10 min, more preferably of at least 0.5 g/10 min and most preferably of at least 1.0 g/10 min.

The coating composition preferably has an $MFR_5$, determined according to ISO 1133, at 190° C. and under a load of 5.00 kg, of not more than 7.0 g/10 min, more preferably of not more than 5.0 g/10 min, and most preferably of not more than 4.0 g/10 min.

Preferably, the coating composition has an $MFR_{21}$, determined according to ISO 1133, at 190° C. and under a load of 21.6 kg, of at least 25 g/10 min, more preferably of at least 30 g/10 min and most preferably of at least 35 g/10 min. The coating composition preferably has an $MFR_{21}$, determined according to ISO 1133, at 190° C. and under a load of 21.6 kg, of not more than 80 g/10 min, more preferably of not more than 70 g/10 min and most preferably of not more than 65 g/10 min.

Preferably, the $FRR_{21/5}$ ($MFR_{21}/MFR_5$) of the coating composition is at least 12, more preferably is at least 15 and most preferably is at least 20.

The $FRR_{21/5}$ ($MFR_{21}/MFR_5$) of the coating is preferably not more than 50, more preferably is not more than 40 and most preferably is not more than 30.

Coating composition according to the present invention preferably has a MWD of 15 to 25, more preferably a MWD of 15 to 25 of 17 to 22 determined as described in the experimental part.

Preferably the coating composition has an eta(1 kPa) of above 1800 kPas, more preferably has an eta(1 kPa) of above 2000 kPas, most preferably an eta(1 kPa) of above 2500 kPas. Usually eta(1 kPa) will be below 20000 kPas.

Preferably the coating composition has an eta(2.7 kPa) of above 1000 kPas, more preferably has an eta(2.7 kPa) of above 1500 kPas, most preferably an eta(2.7 kPa) of above 1700 kPas. Usually eta(2.7 kPa) will be below 15000 kPas.

Preferably the coating composition has an eta(5 kPa) of above 1000 kPas, more preferably has an eta(5 kPa) of above 1200 kPas, most preferably an eta(5 kPa) of above 1300 kPas. Usually eta(5 kPa) will be below 10000 kPas.

The viscosity of the polymer at the extremely low shear stress is determined at a temperature of 190° C. and has been found to be inversely proportional to the gravity flow of the polymer, i.e. the greater the viscosity the lower the gravity flow. A more detailed description of the steps of the method for determination of the viscosity of the polymer at 747 Pa and 190° C. is given below. The determination is made by using a rheometer, preferably a Anton Paar Physica MCR 300 Rheometer. Rheometers and their function have been described in "Encyclopedia of Polymer Science and Engineering", 2nd Ed., Vol. 14, pp. 492-509. The measurements are performed under a constant stress between two 25 mm diameter plates (constant rotation direction). The gap between the plates is 1.8 mm. An 1.8 mm thick compression molded polymer sample is inserted between the plates.

Rheology measurements according to ASTM D 4440-95a may also be used to characterise other important properties of the ethylene copolymer, such as the molecular weight and molecular weight distribution (MWD).

In the present invention the shear stresses (or G*) 1 kPa, 5 kPa, 100 kPa, 210 kPa and 300 kPa are used for calculating shear thinning indices $SHI_{1/100}$, $SHI_{2.7/210}$, $SHI_{5/300}$ $$SHI_{A/B} = \eta^*_A / \eta^*_B$$

where
$\eta^*_A$ is the complex viscosity at G*=A kPa and
$\eta^*_B$ is the complex viscosity at G*=B kPa.

Shear thinning, that is the decrease of viscosity with G*, reflects the broadness and particularly shape of the molecular weight distribution. This property can be approximated by defining a so called shear thinning index, SHI, as a ratio of the viscosity at two different shear stresses as described above.

The storage modulus (G') and the loss modulus (G") together with the absolute value of the complex viscosity ($\eta^*$) as a function of the frequency (w) or the absolute value of the complex modulus (G*) are obtained by rheology measurements.

$$\eta^* = \sqrt{(G'^2 + G''^2)}/\omega$$

$$G^* = \sqrt{(G'^2 + G''^2)}$$

According to Cox-Merz rule the complex viscosity function, $\eta^*(\omega)$ is the same as the conventional viscosity function (viscosity as a function of shear rate), if frequency is taken in rad/s. Then, the absolute value of the complex modulus corresponds to the shear stress in conventional (that is steady state) viscosity measurements. This means that the function $\eta^*(G^*)$ is the same as the viscosity as a function of shear stress.

$SHI_{1/100}$ is preferably within the range of 10-15, $SHI_{2.7/210}$ is preferably within the range of 15-25. $SHI_{5/300}$ is preferably within the range of 22-40.

The coating composition according to the present invention preferably comprises a pigment. The pigment is preferably present in an amount of at least 0.1 wt. %, more preferably of at least 0.5 wt. % and most preferably of at least 1.0 wt. % based on the total coating composition. Preferably, the pigment is present in an amount of not more than 15 wt. %, more preferably not more than 10 wt. % and most preferably not more than 5.0 wt. %. Preferably, the pigment is carbon black or titanium dioxide more preferably carbon black.

In case the coating composition comprises a pigment, the density of the coating composition including the pigment is at least 964.0 $kg/m^3$, more preferably of at least 966.0 $kg/m^3$ and most preferably of at least 967.0 $kg/m^3$.

In addition to the ethylene copolymer the coating composition typically contains conventional additives known in the art in an amount of up to 4 wt. % with respect to the total coating composition. Such additives are, among others, antioxidants, process stabilizers, UV-stabilizers, pigments and acid scavengers.

Suitable antioxidants and stabilizers are, for instance, 2,6-di-tert-butyl-p-cresol, tetrakis-[methylene-3-(3',5-di-tert-butyl-4'hydroxyphenyl)-propionate]methane, octadecyl-3-3 (3'5'-di-tert-butyl-4'-hydroxyphenyl)-propionate, dilaurylthiodipropionate, distearylthiodipropionate, tris-(nonylphenyl)phosphate, distearyl-pentaerythritol-diphosphite and tetrakis(2,4-di-tert-butylphenyl)-4,4'-biphenylene-diphosphonite. Some hindered phenols are sold under the trade names of Irganox 1076 and Irganox 1010. Commercially available blends of antioxidants and process stabilizers are also available, such as Irganox B225 marketed by Ciba-Geigy. Antioxidants and stabilizers are typically used in an amount of from about 500 ppm to about 5000 ppm with respect to the weight of ethylene copolymer. Suitable acid scavengers are, for instance, metal stearates, such as calcium stearate and zinc stearate. They are used in amounts generally known in the art, typically from 500 ppm to 10000 ppm and preferably from 500 to 5000 ppm with respect to the weight of ethylene copolymer.

In addition to the ethylene copolymer the coating composition according to the present invention may contain up to 10%, preferably not more than 5%, by weight of further polymer components, preferably, the coating composition only comprises carrier polymers used in additive masterbatches as further polymers, which are usually polyethylenes.

Preferably the ethylene copolymer according to the present invention is obtainable by blending of at least four different fractions with respect to their molecular weight distribution curves. Usually the ethylene copolymer according to the present invention is made of six fractions or less.

The ethylene copolymer according to the present invention preferably is obtained by in-situ blending of a low molecular weight ethylene homo- or copolymer fraction (LMW) with a high molecular weight ethylene homo- or copolymer fraction (HMW) and a very high molecular weight ethylene homo- or copolymer fraction (VHMW), whereby at least one fraction is a copolymer.

The low molecular weight fraction (LMW) preferably is a homopolymer, whereas the high and the very high molecular fractions (HMW and VHMW) are copolymers.

Production preferably is accomplished by four polymerization stages, namely pre-polymerization, polymerization of the low molecular weight fraction (LMW), polymerization of the high molecular weight fraction (HMW) and polymerization of the very high molecular weight fraction (VHMW). The sequence of these four polymerization stages for the production of the pre-polymerization fraction, the LMW-, HMW- and VHMW fraction is not specific. Any sequence, for examples production of VHMW fraction as the second polymerization stage, production of the HMW fraction as the third polymerization stage and production of the LMW fraction as the fourths polymerization stages is possible. For commercial reasons, the process sequence pre-polymerization fraction, LMW fraction, HMW fraction and VHM fraction is preferred.

The pre-polymerization typically yields a pre-polymerization fraction in an amount of not more than 4 wt. %, more preferably of not more than 3.0 wt. % and most preferably of not more than 2.0 wt. % with respect to the total of the ethylene copolymer. Usually the amount of the prepolymerisation fraction is more than 0.3 wt. % with respect to the total ethylene copolymer. The prepolymerisation fraction preferably is an ethylene homopolymer.

The LMW fraction preferably is produced in a ratio of 0.50 to 0.65, more preferably in a ratio of 0.51 to 0.57 and most preferably in a ratio of 0.52 to 0.56 with respect to the total weight of the ethylene copolymer.

The HMW fraction preferably is produced in a ratio of 0.27 to 0.40, more preferably in a ratio of 0.29 to 0.39 and most preferably in a ratio of 0.33 to 0.38 with respect to the total weight of the ethylene copolymer.

The VHMW fraction preferably is produced in a ratio of 0.07 to 0.20, more preferably in a ratio of 0.08 to 0.18 and most preferably in a ratio of 0.09 to 0.12 with respect to the total weight of the ethylene copolymer.

The LMW fraction is preferably a homopolymer. The HMW fraction and the VHMW fraction preferably are copolymers.

The ethylene copolymer is obtainable by mechanical blending and/or in-situ blending. In-situ blending is preferred. In-situ blending preferably is accomplished by a multi-stage process. Such multi-stage processes can include the use of slurry, bulk and gas phase reactors such as slurry loop reactors, stirred tank reactors, fluidized bed reactors gas loop reactors, moving bed reactors and combinations thereof known in the art.

In a preferred embodiment the ethylene copolymer according to the present invention is obtained by a triple stage reactor process, whereby the first reactor (after pre-polymerisation) is a slurry reactor operated under conditions to produce an ethylene homo- or copolymer (LMW) being composed of ethylene monomer units in an amount of at least 95 mol %, preferably 100 mole % and an $MFR_2$ (ISO 1133, 2.16 kg, 190° C.) of more than 270 g/10 min. Preferably, in the process for producing this fraction (LMW) the slurry reactor (first reaction stage) is operated under the following conditions. The temperature preferably is within the range of 70° C. to 120° C., preferably between 85° C. and 110° C., most preferably 90 to 100° C. The pressure preferably is within the range of 3500 kPa to 7000 kPa, preferably between 5000 kPa to 6500 kPa. The control of the molecular weight of the material obtained in the first reaction stage is preferably achieved by hydrogen addition.

The polymerisation in the slurry reactor usually takes place in an inert diluent, typically a hydrocarbon diluent which is selected from a group comprising $C_1$ to $C_8$ hydrocarbons, such as methane, ethane, propane, n-butane, isobutane, pentane, hexanes such as n-hexane, heptanes, octanes etc. or their mixtures. Preferably the diluent is a low boiling hydrocarbon having from 1 to 4 carbon atoms or a mixture of such hydrocarbons. An especially preferred diluent is propane, possibly containing minor amounts not exceeding a total amount of 3.0 wt % of methane, ethane and/or butane. The slurry reactor preferably is a loop reactor. Then the obtained product from the slurry reactor is fed to a first gas phase reactor. It is important that the slurry from the first reactor is separated from the polymer before feeding the polymer to the second reactor.

The second reactor preferably is a fluidized bed reactor. If so, the following conditions are used: The temperature preferably is between 60 to 110° C., more preferably 70 to 100° C. and most preferably 85 to 95° C. The pressure preferably is 1000 to 3000 kPa, more preferably 1500 to 2500 kPa and most preferably 1800 to 2200 kPa. The $H_2/C_2$ ratio generally will be from 300 to 500 mol/kmol. The comonomer/$C_2$ ratio generally will be from 2.0 to 35 mol/kmol. If the catalyst is BCD80E commercially available from BASF, the $H_2/C_2$ ratio preferably is 360 to 460 mol/kmol, more preferably is 380 to 440 mol/kmol, and most preferably 390 to 430 mol/kmol. The comonomer/$C_2$ ratio preferably is 2.0 to 35 mol/kmol, more preferably is 5 to 25 mol/kmol, and most preferably 10 to 20 mol/kmol.

In a first embodiment, the obtained product from the second reactor is fed to a flash tank and then fed into a third reactor.

In a second embodiment, the second reactor also includes a moving bed reactor. The moving bed reactor has its inlet and outlet connected to the gas phase reactor being the main part of the second reactor.

The third reactor, preferably a gas phase reactor is operated under conditions to produce the final ethylene copolymer.

Preferred reaction conditions for this final polymerisation stage are provided in the following. The reaction temperature differs from the temperature in the first gas reactor within the range of ±10° C., preferably within a range of ±5° C. and most preferably the reaction temperature in the third reactor is the same as in the first gas reactor.

Generally the pressure is 1000 to 3000 kPa, the $H_2/C_2$ ratio generally is 0 to 8 mol/kmol, the comonomer/$C_2$ ratio preferably is 2.0 to 50 mol/kmol.

If the catalyst is BCD80E which is commercially available from BASF, the pressure preferably is 1000 to 3000 kPa, more preferably 1500 to 2500 kPa and most preferably 1800 to 2200 kPa. The $H_2/C_2$ ratio preferably is 0 to 8 mol/kmol, more preferably is 0.1 to 5.0 mol/kmol, and most preferably is 0.5 to 3.0 mol/kmol. The comonomer/$C_2$ ratio preferably is 4.0 to 38 mol/kmol, more preferably is 7 to 28 mol/kmol, and most preferably 12 to 23 mol/kmol.

The process is preferably a continuous process.

The polymerisation is conducted in the presence of an olefin polymerisation catalyst. The catalyst may be any catalyst which is capable of producing all components of the multimodal ethylene copolymer. Suitable catalysts are, among others, Ziegler-Natta catalysts based on a transition metal, such as titanium, zirconium and/or vanadium or metallocene catalysts or late transition metal catalysts, as well as their mixtures. Especially Ziegler-Natta catalysts and metallocene catalysts are useful as they can produce polymers within a wide range of molecular weight with a high productivity.

Suitable Ziegler-Natta catalysts preferably contain a magnesium compound, an aluminium compound and a titanium compound supported on a particulate support.

The particulate support can be an inorganic oxide support, such as silica, alumina, titania, silica-alumina and silica-titania. Preferably, the support is silica.

The average particle size of the silica support can be typically from 10 to 100 µm. However, it has turned out that special advantages can be obtained if the support has an average particle size from 15 to 30 µm, preferably from 18 to 25 µm. Alternatively, the support may have an average particle size of from 30 a 80 µm, preferably from 30 to 50 µm. Examples of suitable support materials are, for instance, ES747JR produced and marketed by Ineos Silicas (former Crossfield), and SP9-491, produced and marketed by Grace.

The magnesium compound is a reaction product of a magnesium dialkyl and an alcohol. The alcohol is a linear or branched aliphatic monoalcohol. Preferably, the alcohol has from 6 to 16 carbon atoms. Branched alcohols are especially preferred, and 2-ethyl-1-hexanol is one example of the preferred alcohols. The magnesium dialkyl may be any compound of magnesium bonding to two alkyl groups, which may be the same or different. Butyl-octyl magnesium is one example of the preferred magnesium dialkyls.

The aluminium compound is chlorine containing aluminium alkyl. Especially preferred compounds are aluminium alkyl dichlorides and aluminium alkyl sesquichlorides.

The titanium compound is a halogen containing titanium compound, preferably chlorine containing titanium compound. Especially preferred titanium compound is titanium tetrachloride.

The catalyst can be prepared by sequentially contacting the carrier with the above mentioned compounds, as described in EP-A-688794 or WO-A-99/51646. Alternatively, it can be prepared by first preparing a solution from the components and then contacting the solution with a carrier, as described in WO-A-01/55230.

Another, especially preferred, group of suitable Ziegler-Natta catalysts contain a titanium compound together with a magnesium halide compound without an inert support. Thus, the catalyst contains a titanium compound on a magnesium dihalide, like magnesium dichloride. Such catalysts are disclosed, for instance, in WO-A-2005/118655 and EP-A-810235.

The Ziegler-Natta catalyst is used together with an activator. Suitable activators are metal alkyl compounds and especially aluminium alkyl compounds. These compounds include alkyl aluminium halides, such as ethylaluminium dichloride, diethylaluminium chloride, ethylaluminium sesquichloride, dimethylaluminium chloride and the like. They also include trialkylaluminium compounds, such as trimethylaluminium, triethylaluminium, tri-isobutylaluminium, trihexylaluminium and tri-n-octylaluminium. Furthermore they include alkylaluminium oxy-compounds, such as methylaluminiumoxane, hexaisobutylaluminiumoxane and tetraisobutylaluminiumoxane. Also other aluminium alkyl compounds, such as isoprenylaluminium, may be used. Especially preferred activators are trialkylaluminiums, of which triethylaluminium, trimethylaluminium and tri-isobutylaluminium are particularly used.

The amount in which the activator is used depends on the specific catalyst and activator. Typically triethylaluminium is used in such amount that the molar ratio of aluminium to the transition metal, like Al/Ti, is from 1 to 1000, preferably from 3 to 100 and in particular from about 5 to about 30 mol/mol.

As discussed above, also metallocene catalysts may be used to produce the multimodal ethylene copolymer. Suitable metallocene catalysts are known in the art and are disclosed, among others, in WO-A-95/12622, WO-A-96/32423, WO-A-97/28170, WO-A-98/32776, WO-A-99/61489, WO-A-03/010208, WO-A-03/051934, WO-A-03/051514, WO-A-2004/085499, EP-A-1752462 and EP-A-1739103.

The coating composition according to the present invention is particularly suitable as the outmost layer of steel pipes.

Such steel pipes include the metal structure as a basis. The metal structure usually is coated with an epoxy layer as a protective layer against oxidation. The epoxy layer usually is further coated by an adhesive layer The standard adhesive layers comprise two components, a non-elastomeric polyethylene and an elastomer, whereby the non-elastomeric polyethylene or both components are grafted with an acid grafting agent such as maleic acid and/or maleic anhydride.

The present invention is concerned with pipes being coated with the coating composition as described above. The present invention is particularly concerned with coated pipes having a multi layer coating, whereby the coating layer as described above is the outermost layer of the pipe.

The epoxy layer typically has a thickness of from 70 to 200 micrometer in on-shore installations and a thickness of from 100 to 350 micrometer in off-shore installations. The thickness of the adhesive layer typically is from 200 to 400 micrometer and preferably from 260 to 320 micrometer.

The thickness of the outermost coating layer preferably is 2 to 4 mm.

The basic process for coating of steel pipes is well known in the art. Briefly, the pipe surface is cleaned by usual methods such as air and water high pressure washing, grit or shot blasting and mechanical brushing. Also acid wash and chromate pre-treatment are sometimes used. The steel pipe usually is protected by a corrosion protection layer using epoxy resins and organosilicon compounds. Examples of suitable epoxy resins are phenol-based epoxies and amine-based epoxies. These kinds of epoxies are sold, among others, under trade names of AR8434 (of Teknos), Scotchkote 226N (of 3M) and PE50-7191 (of BASF). Suitable organosilicon compounds have been disclosed in EP-A-1859926.

An epoxy layer usually is placed by heat coating or spray coating. When heat coating is used, the pipes are heated with induction heating up to about 200° C. The temperature depends on the line speed and the material being used in the corrosion preventing layer (C). When the epoxy Teknos AR8434 is used the steel pipe is preferably heated to 190° C. The temperature decreases slightly during the coating process. Alternatively epoxy powder can be sprayed on with epoxy guns at 23° C., whereby the speed of the rotating pipe is about 9 m/min. The thickness of the epoxy and other coating materials are set in accordance with end use specified requirements.

The extrusion of the adhesive layer usually is performed by a single screw extruder. The same holds for the extrusion of the coating composition according to the present invention. Typical extruder geometry are a diameter of, for instance, from 30 to 100 mm, such as 60 mm, and a length of from 15 to 50 UD, such as 30 UD.

Both the adhesive layer and the top coat layer are usually rolled tightly onto the pipe with a silicone pressure roller.

The process for the coating of the pipe according to the present invention is particularly characterized by a low pressure in the extruder extruding the coating composition according to the present invention. At a screw speed of 25 rpm, the inventive process preferably involves an extruder pressure of 88 bar or lower. At a screw speed of 50 rpm, the inventive process preferably involves an extruder pressure of 119 bar or lower. At a screw speed of 150 rpm, the inventive process preferably involves an extruder pressure of 200 bar or lower. These low pressures reflect the low amount of energy needed.

The process according to the present invention is further characterized by die temperatures of 230° C. or lower at 25 rpm screw speed, 225° C. or lower at 50 rpm screw speed, and 190° C. or lower at 150 rpm screw speed. The lower die temperatures lead to a more stable coating a reduction of defects and less polymer damage.

The inventive process is further characterized by screw speeds of 120 rpm or higher. These screw speeds lead to a significant increase of the output.

The present invention is further concerned with the use of an ethylene copolymer having a comonomer content of 1.5 to 6.0 wt-% with respect to all material having a molecular weight of 400 000 to 600 000 g/mol as determined by SEC/FT-IR analysis or for lowering energy input in steel pipe coating.

EXAMPLES

Definition of Measurement Methods

Molecular Weight Averages, Molecular Weight Distribution, Short Chain Branching (Mn, Mw, MWD, SCB)

Molecular weight averages (Mw, Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4:2003 and ASTM D 6474-99. A Waters GPC2000 instrument, equipped with heated flow cell (at 160° C.) connected via a heated transfer line (at 160° C.) was used with 2× Olexis and 1× Olexis Guard columns from Polymer Laboratories and 1,2,4-trichlorobenzene (TCB) as solvent at 160° C. and at a constant flow rate of 1 mL/min. The heated flow cell is mounted on a sample plate located in a Perkin Elmer Spectrum 100 equipped with a MCT detector. The MCT detector is cooled with liquid nitrogen. During the chromatographic run a series of FTIR spectra is collected using the Perkin Elmer TimeBase V3.0 software. The spectrometer settings were 8 accumulations, scan range from 3000 cm-1 to 2700 cm-1, resolution 8 cm-1. A bandpass filter in the range between 3000 cm-1 to 2700 cm-1 was used in order to attenuate the energy at the detector. All spectra were obtained by single beam measurements and afterwards converted into absorbance spectra for the determination of the methyl branching per 1000 carbons (CH3/1000 C). Therefore background intensity function for all wavenumbers between 3000 cm-1 to 2700 cm-1 was calculated. The background intensity line was determined for each wavenumber during the processing. The line equation was determined calculating the least-squares best line fit between six of the first single beam intensity values (values 4 to 10) and the last six values obtained at each wavenumber.

The conversion of the single beam spectra to absorbance spectra was performed by applying Beer's law: $A_{i,j}=\log(B_{i,j}/S_{i,j})$, where i is the wavenumber, j is the elution time (or sample point), B is the background intensity at a given wavenumber and elution time (measured or calculated respectively) and S is the single beam intensity value at the corresponding wavenumber and elution time.

Molecular weights and molecular weight distribution was evaluated after calculating the chromatograms from the absorbance spectra using root-mean-square (RMS) absorbance over the measured spectral region. The column set was calibrated using universal calibration (according to ISO 16014-2:2003) with at least 15 narrow MWD polystyrene (PS) standards in the range of 1 kg/mol to 12 000 kg/mol. Mark Houwink constants for PS, PE and PP used are as per ASTM D 6474-99. All samples were prepared by dissolving 15.0-22.0 mg of polymer in 9 mL (at 160° C.) of stabilized TCB (stabilized with 250 mg/L 2,6-Di tert butyl-4-methyl-phenol) and keeping for max. 3 hours at max. 160° C. with continuous gentle shaking prior sampling in into the GPC instrument. The spectral data as recorded by Perkin Elmer TimeBase 3.0 software is imported into Polymer Laboratories Cirrus V3.1 software and the evaluation towards molecular weights and molecular weight distribution was performed with this software. The evaluation towards short chain branching was performed by applying a chemometric model using Infometrix Pirouette 4.0 and Instep software 3.0. The calculation of the background intensity line as well as the absorbance spectra was performed with data processing software (e.g. Microsoft EXCEL). The model was generated as described in P. J. DesLauriers, D. C. Rohlfing, E. T. Hsieh; Polymer 2002, 43, 159. The branching degree of all calibration set samples was determined by 13 C melt-state NMR as described in K. Klimke, M. Parkinson, C. Piel, W. Kaminsky, H. W. Spiess, M. Wilhelm, Macromol. Chem. and Phys., 2006, 207, 382; M. Parkinson, K. Klimke, H. W. Spiess, M. Wilhelm, Macromol. Chem. and Phys., 2007, 208, 2128. The calibration set used for this method includes a broad range of differently short chain branched polyethylenes, both single site catalysed and fractions of Ziegler Natta catalysed medium to high molecular weight polyethylene-co-butene and polyethylene-co-hexene covering an overall branching level up to 16.4 methyl groups per 1000 carbons (CH3/1000 C). Calibration samples having probabilities >0.95 were considered as outliers. The method is described in further details in C. Piel, A. Albrecht, C. Neubauer, C. W Klampfl, J. Reussner, Anal. Bioanal. Chem. DOI: 10.1007/s00216-011-4817-6, Titel: Improved SEC-FTIR method for characterisation of multimodal HDPE.

The short chain branching was determined as methyl branching per 1000 total carbons and corrected for up to 2 methyl chain end groups per polymer chain. The cited articles and publications with respect to the determination of methyl branching are incorporated by reference herewith.

Melt Flow Rate (MFR)

The melt flow rate (MFR) is determined according to ISO 1133 and is indicated in g/10 min. The MFR is an indication of the melt viscosity of the polymer. The MFR is determined at 190° C. for PE. The load under which the melt flow rate is determined is usually indicated as a subscript, for instance $MFR_2$ is measured under 2.16 kg load, $MFR_5$ is measured under 5 kg load or $MFR_{21}$ is measured under 21.6 kg load.

Flow Rate Ratio (FRR)

The quantity FRR (flow rate ratio) is an indication of molecular weight distribution and denotes the ratio of flow rates at different loads. Thus, $FRR_{21/5}$ denotes the value of $MFR_{21}/MFR_5$.

Rheology

The sample is temperature conditioned at 190° C. during 2 min before the measurement is started. The measurement is performed at 190° C. After temperature conditioning the measurement starts by applying the predetermined stress. The stress is maintained during 1800 s to let the system approach steady state conditions. After this time the measurement starts and the viscosity is calculated. The measurement principle is to apply a certain torque to the plate axis via a precision motor. This torque is then translated into a shear stress in the sample. This shear stress is kept constant. The rotational speed produced by the shear stress is recorded and used for the calculation of the viscosity of the sample.

Neck-In

Neck-in was given as a width of the film after the 110 mm die in mm. In this test series neck-in is registered at the maximum peripheral speed of pipe the molten film can manage without variations in width. The neck-in was measured at winding speeds of 9, 15, 20, 25 and 30 RPM and screw speed of 25 RPM.

Peel Strength

Adhesion of polymer on steel was tested by Instron 1122 peel strength test equipment according to DIN 30670. A strip of 3 cm width is cut of the coating layer. The other end of the strip is fastened to pulling equipment and the pulling strength is measured during the peeling of the strip from the steel with a pulling speed of 10 mm/min. The results are expressed as N per cm. The peel strength was measured from the coatings produced at a screw speed of 50 RPM.

Density

Density of the polymer was measured according to ISO 1183-2/1872-2B.

Carbon Black Content

The carbon black content has been determined by ASTM D 1603. Inventive examples 1 and 2 were produced according to the conditions given in table 1.

The antistatic agent used in the prepolymerisation reactor was Octastat 3000. The catalyst used was BASF BCD80E.

TABLE 1

|  |  | Inventive example 1 | Inventive example 2 |
|---|---|---|---|
| Product |  | Trimodal SPC | Trimodal SPC |
| catalyst type | type | BCD80E | BCD80E |
| A1 - prepolymerisation |  |  |  |
| Volume | dm³ | 50 | 50 |
| Temperature | °C. | 60 | 60 |
| Pressure | bar | 57 | 57 |
| catalyst feed | g/h | 4.6 | 4.8 |
| cocatalyst feed | g/h | 7.1 | 6.5 |
| antistatic feed (Octastat 3000) | ppm | 10.0 | 10.0 |
| C2 feed | kg/h | 2.0 | 2.0 |
| H2 feed | g/h | 10.1 | 14.4 |
| propane feed | kg/h | 42.8 | 42.7 |
| production rate | kg/h | 1.9 | 1.9 |
| split | wt. % | 3 | 2 |
| A2 - loop reactor |  |  |  |
| Volume | dm³ | 500 | 500 |
| temperature | °C. | 95 | 95 |
| pressure | bar | 56 | 56 |
| cocatalyst feed | g/h | 6.9 | 6.8 |
| C2 feed | kg/h | 39 | 41 |
| H2 feed | g/h | 103 | 104 |
| propane feed | kg/h | 91 | 91 |
| C2 concentration | mol-% | 3.0 | 2.8 |
| H2/C2 ratio | mol/kmol | 493.41 | 520.72 |
| C4/C2 feed ratio | g/kg | 0 | 0 |
| production rate | kg/h | 37.0 | 38.8 |

TABLE 1-continued

|  |  | Inventive example 1 | Inventive example 2 |
|---|---|---|---|
| productivity | kg/g | 8.4 | 8.5 |
| split | wt-% | 52 | 51 |
| MFR2 | g/10 min | 360.0 | 414.0 |
| A3 - GPR1 |  |  |  |
| temperature | °C. | 85 | 85 |
| pressure | bar | 20 | 20 |
| $C_2$ feed | kg/h | 48 | 49 |
| $H_2$ feed | g/h | 470 | 371 |
| $C_6$ feed | kg/h | 1.16 | 1.50 |
| $C_2$ conc. | mol-% | 18.2 | 18.2 |
| $H_2/C_2$ ratio | mol/kmol | 420.99 | 401.46 |
| $C_6/C_2$ ratio | mol/kmol | 13.8 | 17.6 |
| $C_6/C_2$ feed ratio | g/kg | 24 | 30 |
| production rate | kg/h | 26 | 28 |
| productivity (overall) | kg/g | 14 | 14 |
| bed level | cm | 101 | 100 |
| split (process calc.) | wt-% | 36 | 36 |
| comonomer |  | C6 | C6 |
| MFR2 | g/10 min | 6.30 | 7.00 |
| MFR5 | g/10 min | 24.00 | 26.00 |
| density | kg/m³ | 961.8 | 961.5 |
| B3 - GPR2 |  |  |  |
| temperature | °C. | 85 | 85 |
| pressure | bar | 20 | 20 |
| C2 feed | kg/h | 15 | 16 |
| C6 feed | kg/h | 0.30 | 0.40 |
| C2 conc. | mol-% | 3.8 | 4.8 |
| C6 conc. | mol-% | 0.1 | 0.1 |
| H2/C2 ratio | mol/kmol | 2.2 | 0.9 |
| C6/C2 ratio | mol/kmol | 16 | 20 |
| C6/C2 feed ratio | g/kg | 20 | 25 |
| production rate | kg/h | 7 | 8 |
| productivity (overall) | kg/g | 15 | 16 |
| bed level | cm | 100 | 80 |
| split (process calc.) | wt-% | 9.0 | 10.2 |
| MFR2 | g/10 min |  | 0.35 |
| MFR5 | g/10 min | 2.90 | 1.80 |
| MFR21 | g/10 min | 60 |  |
| FRR21/5 | — | 20.7 |  |
| density | kg/m³ | 958.3 | 957.0 |
| Mixer |  |  |  |
| Mixer MFR5 | g/10 min | 2.40 | 1.80 |
| Mixer MFR21 | g/10 min | 51.00 | 38.00 |
| Density base resin | kg/m3 | 958.3 | 957.5 |

The resulting polymer powder was dried from hydrocarbons and mixed with the given amounts of Irganox B225 (Irganox B225: 50:50 (wt./wt.) mixture of Tris(2,4-di-tert-butylphenyl)-phosphite) and Pentaerythritol Tetrakis(3-(3,5-di-tert-butyl-4-hydroxyphenyl)propionate distributed by Ciba Specialty chemicals), calcium stearate and of carbon black Elftex 570 (Cabot Cprp., UK), based on the final composition. The mixture was then extruded into pellets by using a CIM90P twin screw extruder (manufactured by Japan Steel Works). The origin of the material as to the reactors and the extrusion conditions are shown in Table 2 and Table 3.

TABLE 2

| Split |  | A2776 | A2777 |
|---|---|---|---|
| Loop | wt % | 55 | 53.8 |
| 1st GPR | wt % | 36 | 36 |
| 2nd GPR | wt % | 9 | 10.2 |

TABLE 3

| Extrusion conditions | | Inventive example 1 | Inventive example 2 |
|---|---|---|---|
| feed | kg/h | 221 | 220 |
| screw speed | rpm | 408 | 408 |
| specific energy input | kWh/kg | 218 | 221 |
| melt temperature | °C. | 241 | 253 |
| FINAL PROPERTIES | Pellets | | |
| Final $MFR_5$ | g/10 min | 2.10 | 1.70 |
| Final $MFR_{21}$ | g/10 min | 53.0 | 42.0 |
| $FRR_{21/5}$ | — | 25.2 | 24.7 |
| Density pellet | kg/m³ | 969.1 | 967.9 |
| Irganox B225 | ppm | 2110.0 | 2710.0 |
| Carbon black | wt-% | 2.2 | 2.3 |
| Calcium stearate | ppm | 1470.0 | 1010.0 |

Pipe Coating

A steel pipe with a diameter of 114 mm was cleaned to remove the excess material from its surface. The pipe was then heated with induction heating to 190° C. Epoxy powder (Teknos AR8434) was then sprayed onto the pipe surface with the rotating speed of the line of 9 m/min so that the thickness of the epoxy layer was 135 μm. Then an adhesion plastic, a maleic acid anhydride grafted polyethylene adhesive, prepared according to composition 2 in EP 1 316 598 A1, was extruded onto the pipe by using a Barmag single screw extruder with an L/D ratio of 24 and a diameter of 45 mm and where the temperature of the melt after the die was 225° C. The die width was 110 mm. Simultaneously, the composition of Inventive examples 1 or 2 or comparative example 3 respectively was then extruded onto the adhesion layer by using a Krauss-Maffei extruder having a diameter of 45 mm and the L/D ratio of 30. The die width was 240 mm and the temperature of the melt after the die was 250° C. The coating was conducted at extruder screw speeds of 25, 50 and 150 RPM. At the screw speed of 25 RPM five different winding speeds were run. Maximum output was determined at 150 RPM screw speed.

The properties are given in the following table 4.

The polymer used in comparative example 3 was HE3450, distributed by Borealis AG, having a density of 942 kg/m³, an $MFR_2$ (190° C., 2.16 kg) of 2.0 g/10 min and a carbon black content of 2.5 wt %.

TABLE 4

| Parameter | Unit | inventive example 1 A2776 | inventive example 2 A2777 | comparative Example 3 HE3450 |
|---|---|---|---|---|
| Eta (0) | | 7088 | 4276 | 38122 |
| Eta (0.05 rad/s) | | 4010 | 2850 | 26100 |
| Eta (300 rad/s) | | 270 | 230 | 760 |
| Eta (1 kPa) | | 3080 | 2030 | 27600 |
| Eta (2.7 kPa) | | 2300 | 1530 | 23200 |
| Eta (5 kPa) | | 1840 | 1240 | 19800 |
| SHI (0/100) | | 30.0 | 25.1 | 13.7 |
| SHI (1/100) | | 13.3 | 12.0 | 10.0 |
| SHI (2.7/210) | | 23.5 | 20.7 | 25.2 |
| SHI (5/300) | | 29.5 | 26.0 | 41.0 |
| Hardness | None | 61 | 58 | 55 |
| Density | kg/m³ | 968.1 | 966.6 | 940.0 |
| Melting temperature | °C. | | | 127.4 |
| crystallinity | % | | | 61 |
| Crystallization temperature | °C. | | | 116.3 |
| Materials from stage A3 (=1$^{st}$ gpr) or stage B3 (=2$^{nd}$ gpr) | | A3   B3 | A3   B3 | |
| $M_W$ | kg/mol | 8.2   125 | 7.3   142 | 147 |
| $M_N$ | kg/mol | 5.8   6.5 | 5.3   7.4 | 9 |
| MWD | — | 14.1   19.4 | 13.6   19.3 | 17.7 |
| $M_Z$ | kg/mol | 491   729 | 401   901 | 787 |
| Fractionated material having molecular weight 300 000 to 600 000 g/mol | | A3   B3 | A3   B3 | |
| SCB SEC/FT-IR | $CH_3$/1000 C. | 3.21   4.21 | 3.34   4.32 | 14.8 |
| Vicat temperature | °C. | 126.3 | 126.5 | 115.3 |
| $MFR_2$ | g/10 min | 0.39 | 0.3 | 0.5* |
| $MFR_5$ evaluation SPC pilot Screw speed 25 rpm | g/10 min | 2.21 | 1.75 | 2 |
| Output 25 rpm | kg/h | 21.1 | 19.6 | 16.7 |
| Output 25 rpm vs. comparative example 3 (%) | % | 26 | 17 | 0 |

TABLE 4-continued

| Parameter | Unit | inventive example 1 A2776 | inventive example 2 A2777 | comparative Example 3 HE3450 |
|---|---|---|---|---|
| Pressure extruder | bar | 85 | 85 | 89 |
| Pressure die | bar | 40 | 46 | 45 |
| Temp. screw. | ° C. | 222 | 227 | 232 |
| Temp. die | ° C. | 227 | 229 | 235 |
| Torque 25 rpm | | 42 | 42 | 35 |
| Neck-in winding speed 9 rpm | mm | 107 | 102 | 114 |
| Neck-in winding speed 15 rpm | mm | 85-95 | 86-92 | 84 |
| Output 50 rpm | kg/h | 42.2 | 38.6 | 33.1 |
| Output 50 rpm vs. comparative example 3 (%) | % | 27 | 17 | 0 |
| Pressure extruder | bar | 117 | 115 | 120 |
| Pressure die | bar | 49 | 57 | 52 |
| Temp. screw. | ° C. | 204 | 210 | 226 |
| Temp. die | ° C. | 212 | 218 | 232 |
| Torque 50 rpm | | 52 | 48 | 42 |
| Peel Strength 23° C. | N/cm | 426 | 406 | 522 |
| Peel Strength 80° C. | N/cm | 197 | 168 | 234 |
| Screw speed 150 rpm | | | | |
| Output 150 rpm | kg/h | 121.9 | 113.7 | 101 |
| Output 150 rpm vs. comparative example 3 (%) | % | 21 | 13 | 0 |
| Pressure extruder | bar | 200 | 194-198 | 192 |
| Pressure die | bar | 72 | 74 | 71 |
| Temp. screw. | ° C. | 182 | 186 | 203 |
| Temp. die | ° C. | 197 | 196 | 218 |
| Torque 150 rpm | | 73 | 70 | 61 |

The invention claimed is:

1. Coating composition comprising an ethylene copolymer containing not more than 5 mole-% comonomer, whereby the fraction of the ethylene copolymer having a molecular weight of 300 000 g/mol-600 000 g/mol has a methyl branching of more than 4.0 Methyl per 1000 C as determined by SEC/FT-IR analysis.

2. Coating composition according to claim 1, whereby the comonomer(s) is/are selected from $C_3$ to $C_{10}$ alpha olefins.

3. Coating composition according to claim 1, whereby the ethylene copolymer has an eta(1 kPas) of 1800 kPas or higher.

4. Coating composition according to claim 1, whereby the ethylene copolymer has a Mw/Mn of 15 to 25.

5. Coating composition according to claim 1, whereby the ethylene copolymer has a methyl branching of 1.0 to 3.7 Methyl per 1000 C as determined by SEC/FT-IR analysis.

6. Coating composition according to claim 5 comprising a pigment.

7. Coating composition according to claim 6, wherein the pigment is carbon black.

8. Coating composition according to claim 6, wherein the coating composition including the pigment has a density of at least 961.0 kg/m$^3$.

9. Pipe being coated with the coating composition according to claim 1.

10. Pipe according to claim 9, wherein the coating layer is the outermost layer of the pipe.

11. Pipe according to claim 10, whereby the coating layer representing the outermost layer of the pipe directly covers an adhesive layer comprising a polymeric composition obtained by grafting with an acid grafting agent.

12. Process for the coating of a pipe including the extrusion of a coating composition according to claim 1.

13. Process according to claim 12, whereby the pressure in the extruder for extrusion of the coating composition is 119 bar or lower at 50 rpm screw speed.

14. Process according to claim 12, whereby the die temperature of the extruder for extrusion of the coating composition is 225° C. or lower at 50 rpm screw speed.

15. Process according to claim 12, whereby the die temperature of the extruder for extrusion of the coating composition is 200° C. or lower at 150 rpm screw speed.

* * * * *